Sept. 9, 1969          E. V. DUPRE          3,465,804

CUSHIONED WHEEL

Original Filed Oct. 20, 1965

INVENTOR.
EDWIN V. DUPRE

BY Carl R. Brown

ATTORNEY

United States Patent Office 3,465,804
Patented Sept. 9, 1969

3,465,804
CUSHIONED WHEEL
Edwin V. Dupre, 440 J Ave.,
Coronado, Calif. 92118
Continuation of application Ser. No. 499,103, Oct. 20, 1965. This application Sept. 20, 1967, Ser. No. 669,077
Int. Cl. B60b 9/02
U.S. Cl. 152—11
6 Claims

ABSTRACT OF THE DISCLOSURE

A rotatable wheel that has resilient elements disposed within the confines of the wheel to provide a shock absorbing structure in the wheel itself. Such resilient elements are structurally composed of either cylindrical rubber plugs or oval shaped springs.

Cross reference to a related application

The present application is a continuation of Ser. No. 499,103, filed Oct. 20, 1965; which application has been abandoned.

Background of the invention

There are many devices involving large numbers of parts to handle the problem of wheel shock in a vehicle such as automobiles, trucks, airplanes and the like. The Hotchkiss drive, involving leaf springs, in the conventional rear wheel drive vehicle necessitates a drive shaft running from the engine transmission to the differential structure along the length of the vehicle. This requires a hump in the floor of the vehicle to accommodate the shaft, and is very objectionable to the vehicle owner. Also, complex shock absorbing mechanisms, flexible shaft connections and other arrangements are usually required to handle the wheel shock problem. Yet compromises between the use of shock absorbing mechanisms and maintaining adequate stability of the vehicle in larger vehicles, requires the use of inflated tires to absorb a considerable amount of wheel shock. The problems involved in the use of inflated tires are well known.

Smaller vehicles using wheels that experience wheel shock, such as roller skates, bicycles, wagons, carts and the like, normally do not have adequate means for absorbing wheel shock, because such vehicles cannot, in a practical sense, accommodate such known shock absorbing devices.

Therefore it is advantageous to have a simplified wheel construction that provides a shock absorbing structure within the wheel itself, and which wheel construction is stable and can effectively use solid tires.

Summary of the invention

The present invention provides a very simple wheel construction with a shock absorbing arrangement forming an integral part of the wheel. It eliminates or minimizes the necessity for supplemental shock absorbing structures and systems external to the wheel, although it can be effectively used with such systems. The wheel construction may be used in supporting any type of vehicle, large or small, and gives a smooth floating ride with safety solid tires or pneumatic tires. The wheel of my invention provides individual shock absorbing at each wheel and eliminates or reduces the need for leaf springs, hydraulic springs, shock absorbers, coil springs and the like.

It is therefore an object of the present invention to provide a novel and improved, simple and effective, cushioned wheel that uses a small number of parts and that is operational in either forward or reverse direction of wheel rotation.

It is another object of the present invention to provide a novel and improved cushioned wheel that may be used on any size vehicle and eliminates or reduces the need for conventional shock absorbing mechanisms.

It is another object of the present invention to provide a novel and improved cushioned wheel that is capable of giving a smooth ride with solid tires.

It is another object of the present invention to provide a novel and improved cushioned wheel wherein resilient elements, of the same size, are positioned between hub portion of the wheel and the rim portion of the wheel to absorb wheel shock, including shock encountered when the wheel is rotated in either the forward or reverse direction.

Further objects and advantages of the present invention will readily occur to one skilled in the art to which the invention pertains upon reference to the accompanying detailed description.

Figure 1:
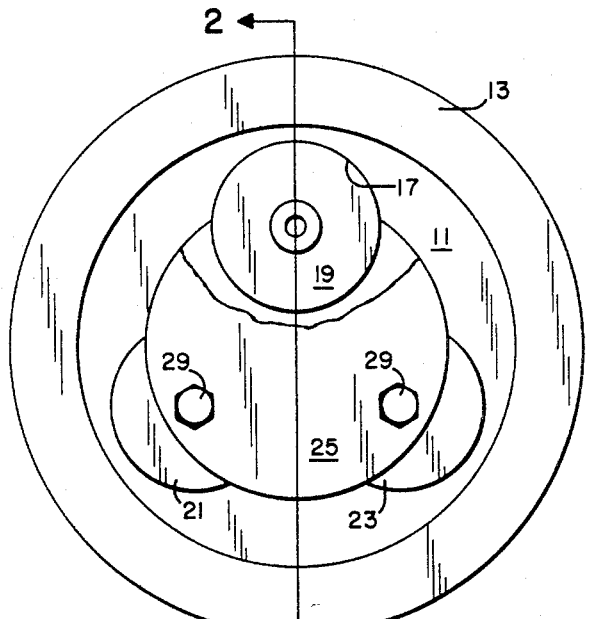
FIGURE 1 is a side elevation of a cushioned wheel constructed in accordance with the first embodiment of my invention using resilient solid plugs, with a portion of the structure facing the viewer being broken away to reveal the internal arrangement.
Figure 2:
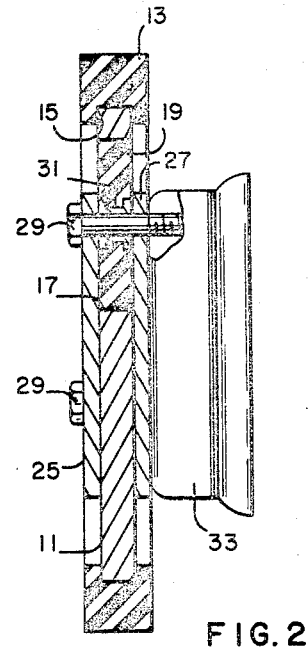
FIGURE 2 is a mid-sectional elevation of the wheel of FIGURE 1 taken along the line 2—2 in the direction of the arrows, and showing a brake drum attached.

Referring to the drawings, FIGURES 1 and 2 illustrate the first embodiment wherein the resilient means for cushioning wheel shock takes the form of rubber-like plugs 19, 21 and 23. The wheel comprises a circular support disc 11 which has disposed around the outer edge thereof a solid resilient tire 13. The support disc fits snugly into the seating groove 15 of the tire 13. The supporting disc has three equally spaced circular holes transversely therethrough, such as the hole 17. Plugs 19, 21 and 23 of tough, resilient material are inserted in these holes. Hard rubber, plastic or other suitable materials are acceptable for making the plugs and the tire with the resilience of the material depending upon the application or use of the wheel.

An outer disc 25 is placed against the support disc 11 and the outer faces of the resilient plugs 19, 21 and 23, and an inner disc 27 is placed against the inner faces of the support disc and the resilient plugs. The outer and inner discs may be made of lightweight, rigid, structurally strong material. The outer and inner discs 25 and 27 have holes that mate with holes in the centers of the resilient plugs 19, 21 and 23 so that bolts 29 may be inserted therethrough. It will also be noted that each resilient plug has a spacer 31 surrounding its hole to provide bearing faces for the inner and outer discs 25 and 27. The embodiment illustrated in FIGURES 1 and 2 has a brake drum 33 into which the bolts 29 are threaded. The supporting axle may be secured to the inner surface of the brake drum in any suitable manner, such as by a plate connection or the like.

When the wheel is assembled in position, it will be obvious that wheel shock encountered by the tire 13 will be partially absorbed by the tire, but the greatest amount of the shock will be absorbed by the resilient plugs 19, 21, and 23. The plugs are held in position around their outer circumference by the cylindrical holes 17 in disk 11 and on each side by disks 25 and 27. Thus it may be seen that movement of the wheel between the road surface and the brake drum is possible in any direction within the vertical plane of the wheel, while side sway of the wheel is prevented by the abutting surfaces of disks 25 and 27 and disk 11. Spacers 31 provide sufficient space between disks 25 and 27, that sliding movement occurs between disks 25 and 27 and the surfaces of disk 11.

Figure 3:
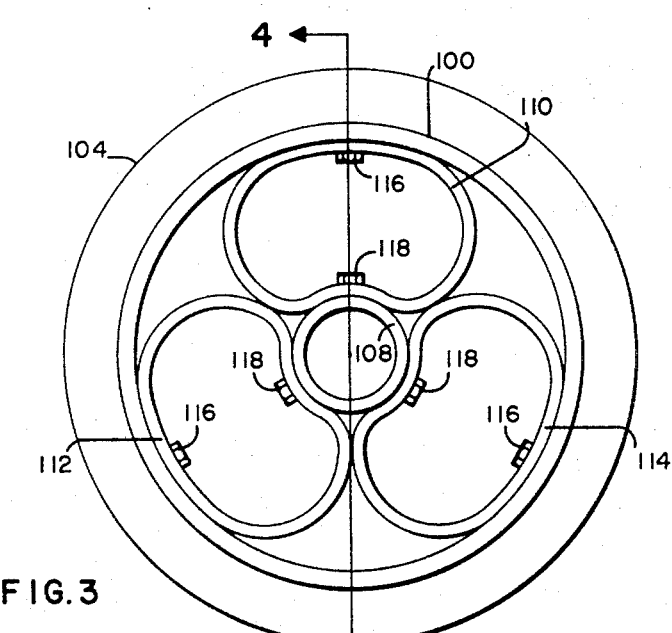
FIGURE 3 is a side elevation of a cushioned wheel constructed in accordance with the second embodiment of my invention wherein oval shaped springs constitute the resilient elements rather than the resilient plugs.
Figure 4:
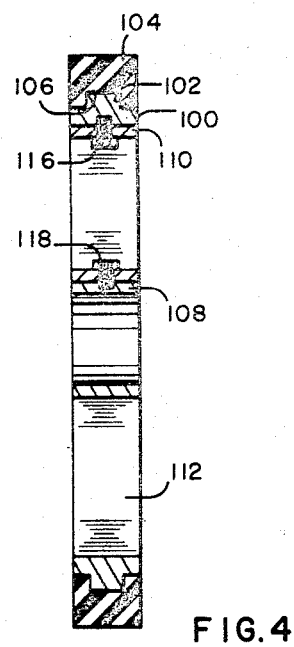
FIGURE 4 is a mid-sectional elevation of the wheel of FIGURE 3 taken along the line 4—4 in the direction of the arrows.

FIGURES 3 and 4 of the drawings illustrate the second embodiment of my invention wherein an annular supporting ring 100 has formed thereon an outwardly projecting rim portion 102. A tire 104 with a groove 106 is snugly seated on the supporting ring as illustrated in FIGURE 4. Hub 108 is spaced inwardly from the supporting ring 100 by at least three oval shaped springs 110, 112 and 114. These springs are made of a suitable tough, resilient material such as spring steel and are equal in size to provide balanced supporting and springing action.

The springs are affixed to the support ring by the bolts or screws 116, and are affixed to the hub 108 by the bolts or screws 118. The hub 108 can be constructed in any suitable manner to adapt it for connection to the axle or shaft arrangement with which it is used.

The adjacent points of the outer surfaces of each of springs 110, 112 and 114 abut each other and thus the springs function individually and as a group to restrain the springs from excessive movement circumferentially. Thus the springs not only have resilience radially from the hub 108 to absorb shocks, but also have sufficient structural resistance to prevent excessive rotational movement of hub 108 relative to rim 100 during braking or acceleration of a vehicle using the wheel construction of my invention.

Figure 5:
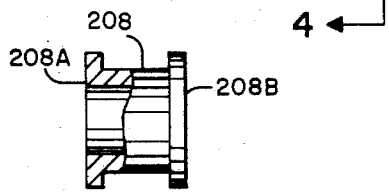
FIGURE 5 is a front elevation, partly in section, of a modified hub member which can be used with the embodiment shown in FIGURES 3 and 4.

The hub for the second embodiment may also be constructed as illustrated in FIGURE 5, wherein the hub 208 has annular flanges 208A and 208B that retain the springs 110, 112 and 114 of FIGURES 3 and 4, in position and restrain them from substantial lateral displacement relative to the wheel plane.

Figure 6:
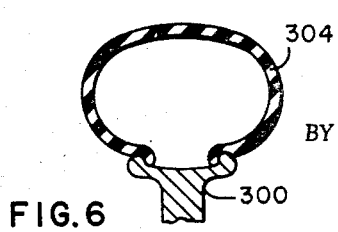
FIGURE 6 is a fragmentary sectional view of a ring member, usable with either embodiment of the invention, which renders the invention useful with pneumatic rather than solid tires.

FIGURE 6 is a fragmentary view showing how a supporting member 300, similar to the disc 11 of FIGURES 1 and 2 and ring 100 of FIGURES 3 and 4 can be formed with a bead receiving channel 302 to seat and accommodate a pneumatic tire 304.

The above representative embodiments disclose how my invention lends itself to a very simple and easy to manufacture construction.

Having thus described my invention, I claim.

1. A cushioned wheel construction comprising,
a central structure comprising a pair of aligned disks that are connected to an axle,
a third disk positioned between said pair of aligned disks,
said third disk having transverse round holes,
rubber-like cylindrical plugs are positioned in said holes,
said plugs have central openings,
said pair of disks have sufficient diameters to substantially cover the side surfaces of said plugs,
bolts are disposed through said disks and central openings to hold the same in assembly,
spacers fit in said central openings and hold a given space between said pair of disks, whereby said third disk is able to move radially relative to said pair of disks and said plugs,
and a resilient tire is secured to the outer periphery of said third disk.

2. A cushioned wheel construction as claimed in claim 1 in which,
a brake drum secured to the axle which drum has a plurality of threaded holes,
and one of the ends of said bolts being threaded into said holes.

3. A cushioned wheel construction as claimed in claim 2 in which,
each of said plugs having a diameter only slightly smaller than the radius of said third disk.

4. A cushioned wheel construction comprising,
a central ring structure that is connectable to an axle,
a small number of relatively large ring shaped resilient elements are positioned in a circle with their adjacent outer surfaces secured to the outer surface of said central ring structure,
an outer tire carrying ring is secured to the outer surfaces of said resilient elements,
said resilient elements are contracted between said inner and outer rings to oval shapes wherein the adjacent sides of said elements abut.

5. A cushioned wheel construction as claimed in claim 4 in which,
said central ring has a radially outward projecting flange at each side that abuts the sides of the resilient elements and restrains said elements against transverse movement.

6. A cushioned wheel construction as claimed in claim 5 in which,
said elements have a width that is as wide as the widest part of the wheel.

References Cited

UNITED STATES PATENTS

| 685,229 | 10/1901 | Smith | 295—11 |
| 1,207,993 | 12/1916 | Park | 152—33 |

FOREIGN PATENTS

| 375,090 | 2/1907 | France. |
| 1,849 | 1858 | Great Britain. |
| 6,067 | 1915 | Great Britain. |

ARTHUR L. LA POINT, Primary Examiner

U.S. Cl. X.R.

152—40, 49